US012596057B2

(12) United States Patent
Kohn

(10) Patent No.: US 12,596,057 B2
(45) Date of Patent: Apr. 7, 2026

(54) ADAS CALIBRATION SYSTEM INCLUDING MOTOR VEHICLE CENTERLINE ALIGNMENT ELEMENT

(71) Applicant: Jacob Kohn, Cape Coral, FL (US)

(72) Inventor: Jacob Kohn, Cape Coral, FL (US)

( * ) Notice: Subject to any disclaimer, the term of this patent is extended or adjusted under 35 U.S.C. 154(b) by 586 days.

(21) Appl. No.: 17/876,212

(22) Filed: Jul. 28, 2022

(65) Prior Publication Data

US 2024/0035927 A1     Feb. 1, 2024

(51) Int. Cl.
*G01M 17/007* (2006.01)
*G01M 99/00* (2011.01)

(52) U.S. Cl.
CPC ........ *G01M 17/007* (2013.01); *G01M 99/008* (2013.01)

(58) Field of Classification Search
CPC ......... G06T 7/80; B60R 11/04; G01S 7/4972; G01S 13/931; G01S 17/931; H04N 9/3185; G06V 20/56
See application file for complete search history.

(56) References Cited

U.S. PATENT DOCUMENTS

| | | | | |
|---|---|---|---|---|
| 2010/0186244 | A1* | 7/2010 | Schwindt | G01S 13/931 |
| | | | | 33/288 |
| 2020/0088515 | A1* | 3/2020 | Rogers | H04N 23/54 |
| 2021/0080253 | A1* | 3/2021 | Newkirk | G01B 11/275 |
| 2021/0387637 | A1* | 12/2021 | Rogers | G01B 11/2755 |

* cited by examiner

*Primary Examiner* — Timothy P Graves
(74) *Attorney, Agent, or Firm* — William E. Noonan

(57) ABSTRACT

A system is provided for calibrating ADAS sensors of a motor vehicle supported on a substantially level underlying floor. The system includes a target assembly having a base for engaging the floor. The base includes a linear alignment edge. The target assembly further includes an upright support attached to and extending vertically upwardly from the base, which support carries an ADAS target panel having a target surface secured to and facing forwardly of the base. The target surface has a horizontal axis substantially parallel to the linear alignment edge. An elongate alignment element engages and extends forwardly from the linear alignment edge. The system is positioned and oriented on the floor such that the target surface faces and opposes the ADAS sensors and the alignment element aligns with a longitudinal centerline of the motor vehicle and extends perpendicularly from the linear alignment edge of the base. This orients the horizontal axis of the target surface perpendicularly to the longitudinal centerline of the vehicle.

20 Claims, 5 Drawing Sheets

ADAS CALIBRATION SYSTEM INCLUDING MOTOR VEHICLE CENTERLINE ALIGNMENT ELEMENT

FIELD OF THE INVENTION

This invention relates to a system for accurately and efficiently performing static calibration of a motor vehicle's ADAS sensors.

BACKGROUND OF THE INVENTION

Motor vehicles increasingly employ advanced driver assistance systems (ADAS) to enhance driving safety. Such systems employ camera and radar sensors that warn the driver of an impending danger and/or direct the vehicle to initiate an appropriate response such as braking, collision avoidance, etc. ADAS systems that utilize data from front facing sensors include adaptive cruise control (ACC), automatic emergency braking (AEB), forward collision warning (FCW), lane departure warning (LDW), lane keeping assist and automatic high beams.

It is critical that ADAS sensors be precisely aligned in order to operate properly and provide their intended safety benefits. A sensor that is out of its proper alignment by even a small amount will likely be significantly misdirected along the highway. This can cause delayed response times in the ADAS system itself, which can greatly increase the risk of a collision and potentially disastrous consequences. Typically, the ADAS sensors in new vehicles are calibrated and positioned according to standard factory specifications. Events such as collisions, vehicle repairs and parts replacement (e.g., windshields, bumpers, etc.) can cause misalignment of the forward-facing ADAS sensors. Such sensors require recalibration and realignment to function properly and provide their intended safety benefits.

Currently, most vehicles employ at least some degree of static calibration to properly realign their ADAS sensors. Static calibration of the forward-facing sensors requires the use of an unwieldy tool featuring an aiming target supported at a predetermined height and precisely measured distance in front of the vehicle, and supported perfectly perpendicular to the longitudinal access of the vehicle. Typically, the target is carried by a large support having a heavy horizontal arm that extends beyond the respective sides of the vehicle. The distance between each end of the arm and a respective rear wheel of the vehicle is measured by means of a measuring tape or digital reader. The calibrating tool is adjusted so that the distances between the respective rear wheels and their corresponding ends of the calibration arm are equal. This positions the target perpendicularly to the longitudinal access of the vehicle so that proper calibration can be performed.

The foregoing conventional calibration tool is unduly large, bulky and expensive. It is not conveniently portable. Properly positioning the tool and target in front of the vehicle to obtain accuracy is tedious and time consuming. This complicates the ADAS calibration process considerably.

SUMMARY OF THE INVENTION

It is therefore an object of the present invention to provide an improved ADAS calibration system that enables ADAS sensors to be accurately calibrated more quickly, and efficiently, and less expensively than achieved by existing ADAS calibration tools.

It is a further object of this invention to provide an ADAS calibration system that is more compact and portable and much easier and more convenient to use than existing ADAS calibration systems.

It is a further object of this invention to provide an ADAS calibration system that is especially effective and advantageous for performing static calibration of forward-facing motor vehicle ADAS sensors.

It is a further object of this invention to provide an ADAS calibration system that provides for accurate recalibration of ADAS sensors following any one of a variety of motor vehicle events including, but not limited to, vehicle collisions, fender benders, windshield replacement, vehicle repairs and parts replacement, vehicle alignment and changes of tire size.

It is a further object of this invention to provide an ADAS static calibration system that eliminates having to tediously measure the distances between respective rear wheels and corresponding locations on a calibration tool or having to make subsequent adjustments and remeasurements in order to achieve an accurate alignment of the calibration target in front of the vehicle as previously required using conventional static calibration systems.

This invention features a system for calibrating one or more ADAS sensors directed from one end of a motor vehicle, which motor vehicle is supported on a substantially level underlying horizontal floor. The system includes a target assembly having a base for engaging the underlying floor. The base includes a linear alignment edge. An upright support is attached to and extends vertically upwardly from the base. The support carries an ADAS target panel having a target surface that faces forwardly of the base and a horizontal axis that is substantially parallel to the linear alignment edge. An elongate alignment element is engageable with and extendable forwardly from the linear alignment edge of the base. The system is positioned and oriented on the underlying floor such that the target surface of the ADAS target panel faces and opposes the one or more ADAS sensors and the alignment element is aligned with a longitudinal centerline of the motor vehicle and extends perpendicularly from the linear alignment edge of the base. As a result, the horizontal axis of the target surface is oriented perpendicularly to the longitudinal centerline of the vehicle.

In a preferred embodiment, the alignment element is flexible and typically employs string. The base may include a parallel pair of rearward and forward beams wherein the linear alignment edge is carried by the forward beam. The forward and rearward beams may further include respective linear midpoints that are typically aligned such that the alignment element extends between and perpendicularly intersects the rearward and forward beams.

The support may include a pair of vertical posts to which the ADAS target panel is connected by a horizontal crossbar. The crossbar may be mounted to the support post for moving selectively in upward and downward directions. The ADAS target panel may also be hingedly connected to the horizontal crossbar to enable adjustment of the angle of the forward facing target surface relative to the underlying surface and ADAS sensors of the motor vehicle.

The base may include a rectangular frame. For example, the base may employ a pair of parallel side beams that perpendicularly interconnect respective ends of the forward and rearward beams to hold the forward and rearward beams parallel to one another. The base may include an alignment bracket perpendicularly interconnecting the forward and rearward beams and having a central slot, for receiving the linear alignment element therethrough. The central slot may be aligned with the respective linear midpoints of the forward and rearward beams. The linear midpoints of the forward and rearward beams may include respective guidelines or indicia that mark respective points of intersection of the linear alignment element with the forward and rearward beams.

This invention also features a method of calibrating ADAS sensors directed from an end of a motor vehicle supported on a substantially level underlying horizontal floor. An ADAS target assembly and an elongate alignment element, as previously described, are provided. The target assembly is positioned on the underlying floor such that the target surface of the ADAS target panel faces and opposes the ADAS sensors. A longitudinal centerline of the motor vehicle is determined such as by plumbing and marking points on the floor directly below the front and rear badges of the motor vehicle. The target assembly and alignment element are then manipulated such that the alignment element is aligned with the longitudinal centerline of the motor vehicle and extends perpendicularly from the linear alignment edge of the forward beam or other portion of the base. As a result, the horizontal axis of the ADAS target panel's target surface is oriented perpendicularly to the centerline of the motor vehicle.

To confirm that the target is properly aligned with the ADAS sensors, the angle between the extended alignment element and the linear alignment edge is measured by using a 90 degree square, protractor or digital angle ruler. The orientation of the target assembly can then be adjusted, if necessary, to align the target so that it is perfectly perpendicular to the centerline of the vehicle.

The target assembly may also be constructed so that the vertical angle of the target surface can be adjusted if necessary to maintain the target surface perfectly upright and not tilted forwardly or rearwardly relative to the ADAS sensors. The support may include a pair of vertical posts and the target panel may be attached to a crossbar that is hingedly mounted to the two support posts. The crossbar may also be slidably or otherwise moveably mounted to the vertical posts so that the height of the ADAS target panel may be adjusted for properly calibrating the sensors. During the calibration process, one end of the alignment element may be attached to the rearward beam of the base and the opposite end of the alignment element may be secured to the underlying floor proximate the end of the motor vehicle that is opposite to the end from which the ADAS sensors being calibrated are directed. The string or other alignment element may also be secured to the underlying floor at a point rearwardly of the rearward beam (beam) or otherwise rearwardly of the base.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
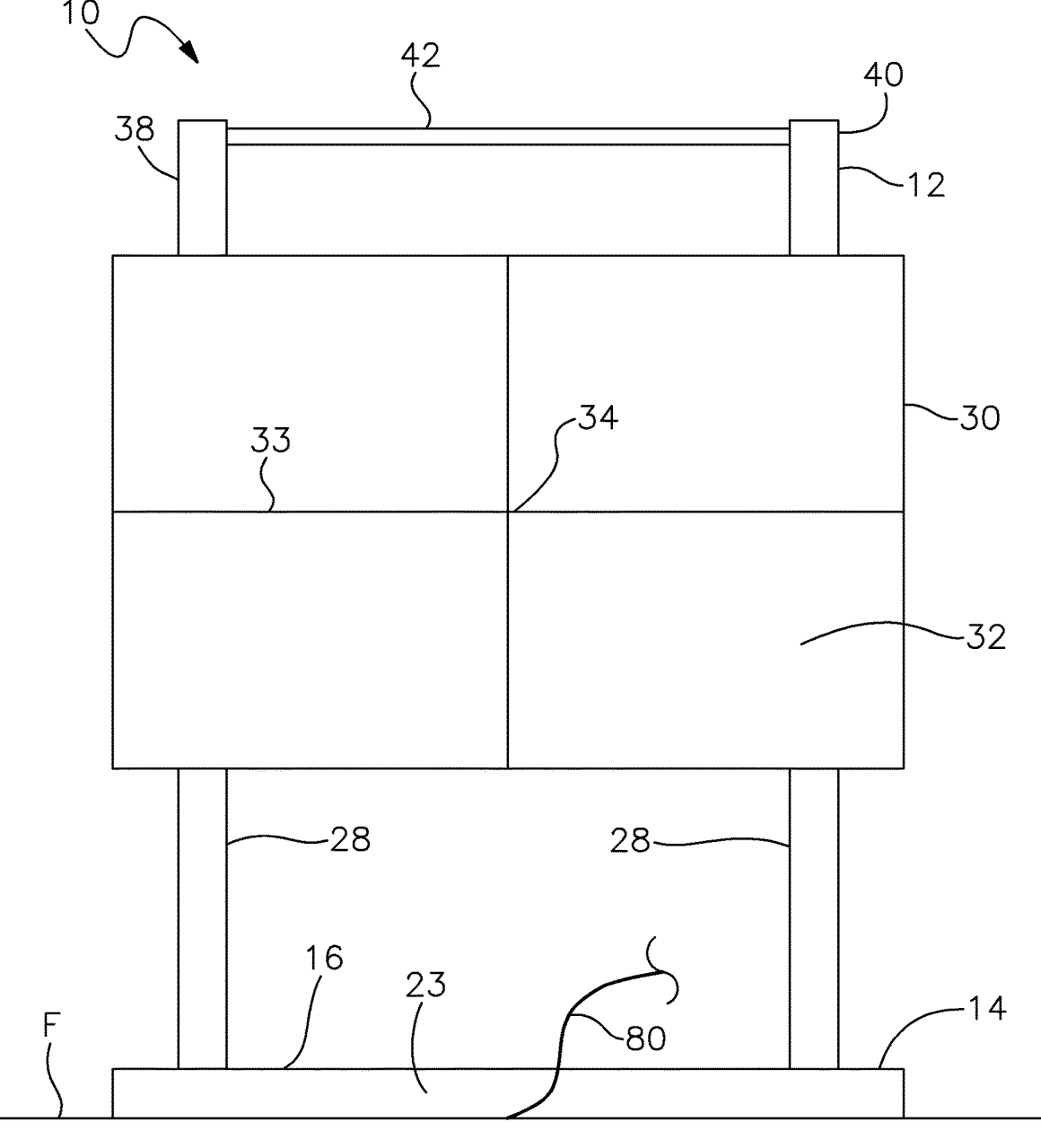
FIG. 1 is a front elevational view of a preferred ADAS sensor calibration system in accordance with this invention.
Figure 2:
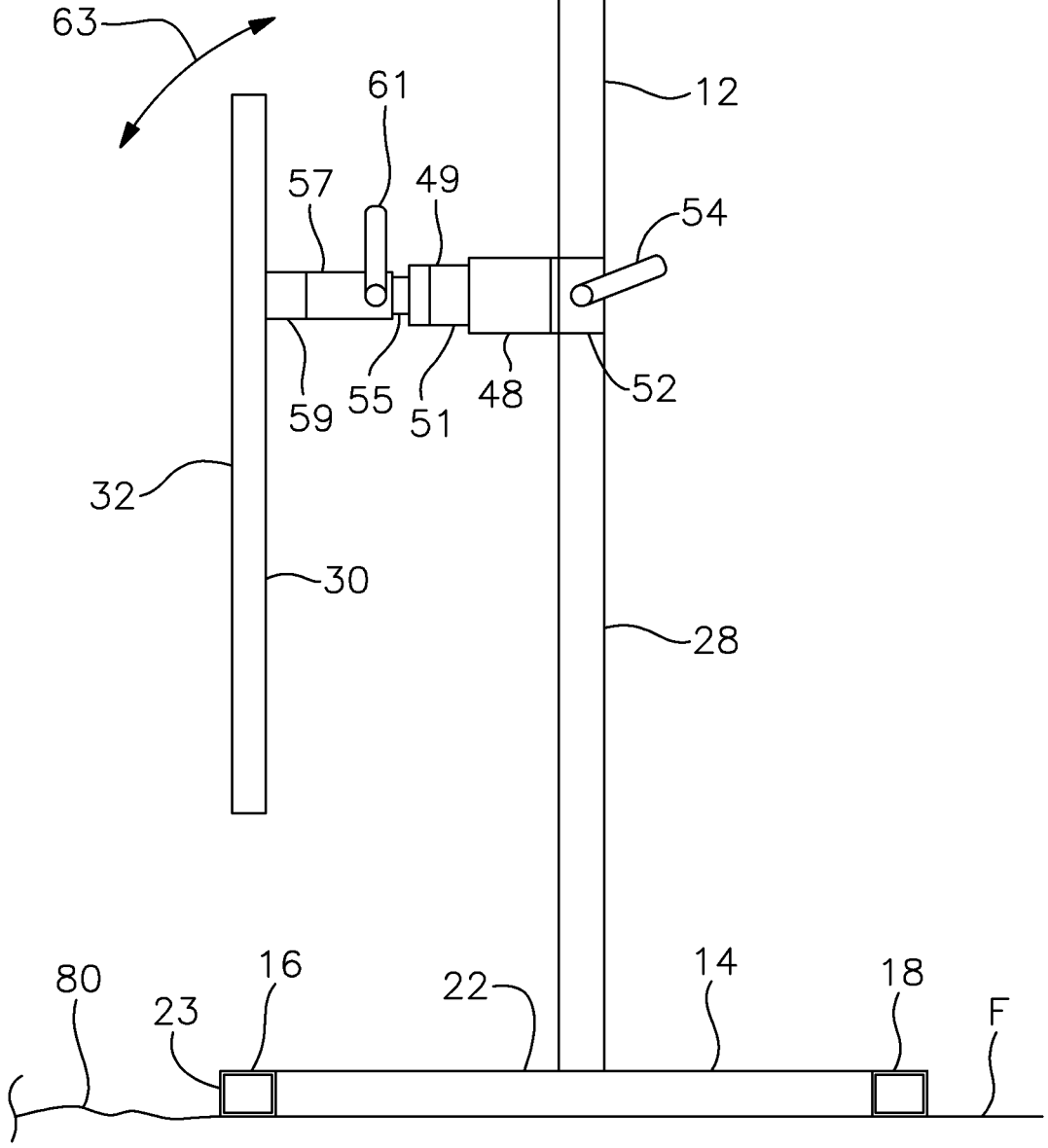
FIG. 2 is side elevational view of the calibration system.
Figure 5:
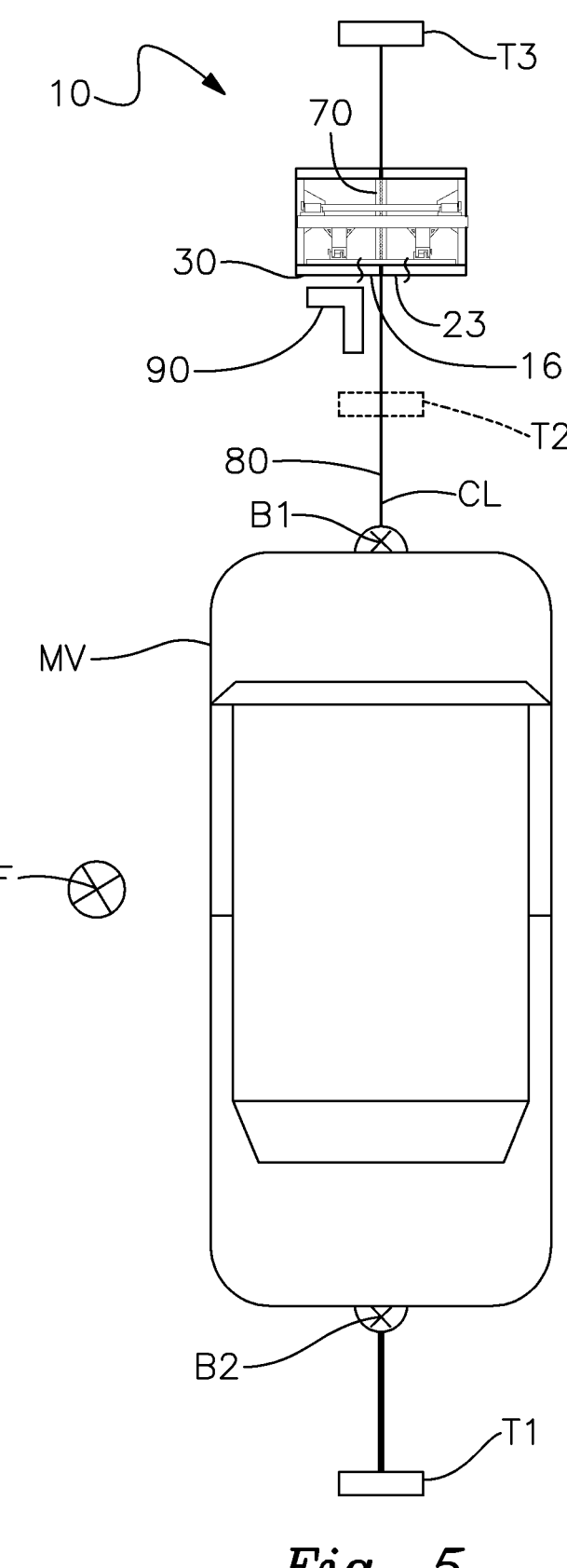
FIG. 5 is a schematic view of the alignment system being used in accordance with this invention to calibrate and properly align the ADAS sensors directed from the front end of a motor vehicle.

There is shown in FIGS. 1, 2 and 5 an ADAS calibration system 10 for calibrating one or more conventional ADAS sensors of a motor vehicle MV (shown only in FIG. 5) that is supported on a substantially horizontally level underlying floor F. It should be understood that the construction and operation of ADAS sensors, as well as the basic process for calibrating such sensors, employing a target at which the sensors are directed, will be understood by persons skilled in the art. The electronic technology (such as an ADAS diagnostic scan tool) used to perform the calibration is likewise conventional, and does not comprise a feature of this invention. The improvement disclosed herein particularly relates to a new system for positioning and orienting the ADAS sensor calibration target more quickly, efficiently and conveniently in front of the ADAS sensors in order to perform the precise realignment and recalibration of the sensors that is required following a collision, repair or other adjustment/ modification of the vehicle.

System 10 is suitable for use on virtually all makes and models of motor vehicles employing ADAS sensors and for which static calibration is utilized. Again, the type of vehicle and the particular number or arrangement of sensors utilized are not limitations of this invention. System 10 is particularly effective for use in calibrating the ADAS sensors directed from the forward or front end of the vehicle. These sensors are typically oriented to project signals forwardly from the bumper or dash of the vehicle. Alternatively, system may be employed to calibrate the sensors mounted to the rear bumper for directing ADAS signals from the rear end of the vehicle.

Figure 3A:
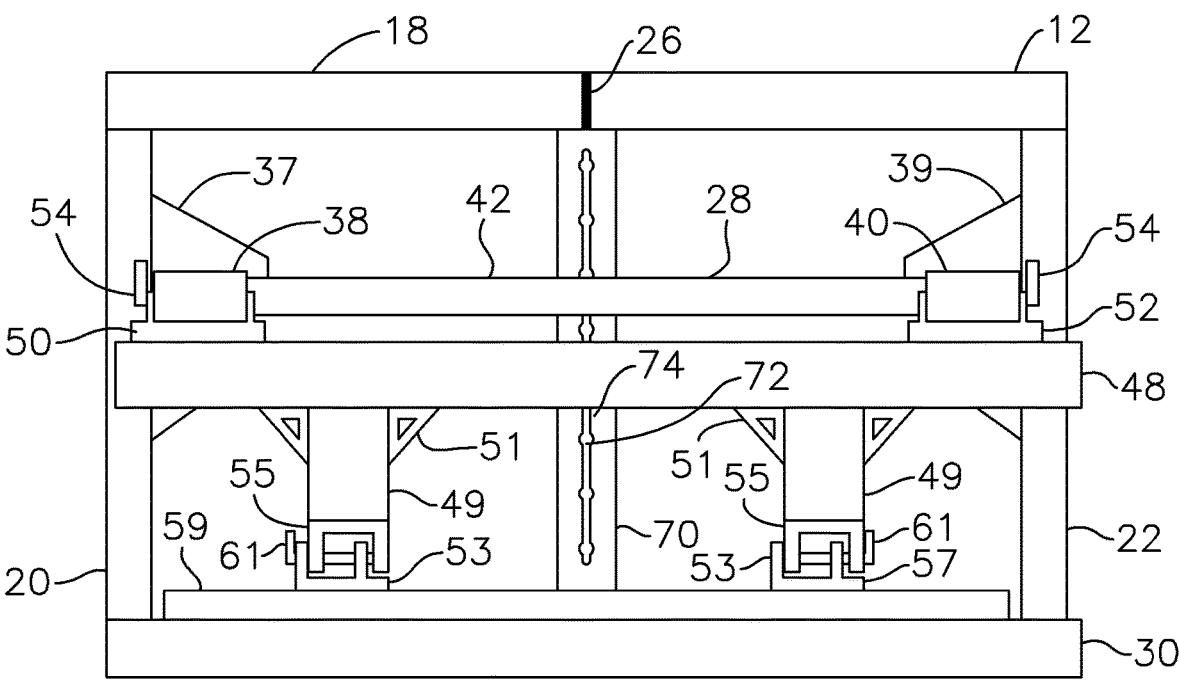
FIG. 3A is a top plan view of the target assembly of the calibration system prior to engagement with the linear alignment element.
Figure 3B:
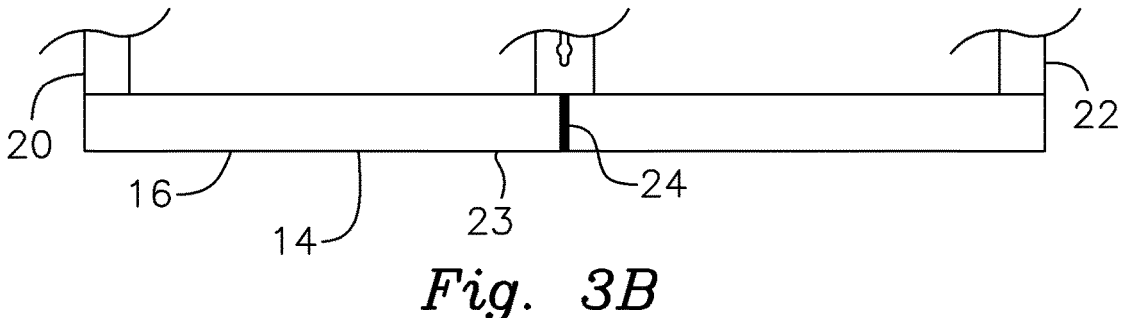
FIG. 3B is a fragmentary top view of a forward portion of the target assembly base.

As best shown in FIGS. 1 and 2, system 10 includes a target assembly 12 (shown alone in FIG. 3A). Target assembly 12 includes a rectangular base 14 that engages underlying floor F. Base 14 includes a parallel pair of forward and rearward beams 16 and 18, respectively. In the top plan view of FIG. 3A forward beam 16 is hidden by other components of target assembly 12, including target panel 30 and horizontal mounting bar 59, which are described more fully below. A top view of beam 16 is shown in FIG. 3B. The forward and rearward beams have substantially equal lengths and are themselves interconnected at corresponding ends by a parallel pair of side beams 20 and 22. Each of beams 16-22 preferably has a square or rectangular cross sectional configuration. The beams can be composed of various metals, metal alloys and/or synthetic materials within the scope of this invention. The longitudinal midpoints of forward and rearward beams 16 and 18 are marked by respective transverse guidelines 24 and 26, FIGS. 3A, 3B and 4. These guidelines are formed perpendicularly across the longitudinal axes of beams 16 and 18 and function in a manner that is described more fully below. A linear alignment edge 23 is defined by a leading or front vertical wall of forward beam 16. Linear alignment edge 23 is substantially flat and perfectly straight. In alternative embodiments an analogous linear alignment edge may be formed elsewhere in the base. The linear alignment edge is critically important for properly aligning the target assembly with the ADAS sensors being calibrated. That operation is described more fully below.

Target assembly 12 further includes an upright support 28 that is attached to and extends vertically upwardly from base 14. Support 28, which is described in detail below, carries a conventional ADAS target panel 30 having a substantially planar target surface 32, which is positioned and aligned in the manner, also described more specifically below, to face forwardly of base 14 and flush with alignment edge 23 of forward beam 16. As best depicted in FIG. 1, target surface 32 includes standard ADAS calibration indicia such as traditional crosshairs 34 that are typically used during the calibration process to define the center of target surface 32 and properly align the sensors. Target surface 32 includes a horizontal axis 33. In the version shown herein, horizontal axis 33 is formed by the horizontal line of crosshairs 34. However, it should be understood that in alternative embodiments, a horizontal indicia line may be omitted. As used herein, the "horizontal axis" of the target surface should be understood to refer to the target surface's horizontal axis of symmetry, which is substantially parallel to the horizontal surface of the floor.

More particularly, upright support 28 includes a pair of posts 38 and 40 that are joined proximate their respective upper ends by a horizontal connecting piece 42. Posts 38 and 40 are secured to base 14 in the manner shown in FIG. 4. In particular, the lower end of each post is received in a respective trapezoidal block 37, 39. Block 37 is, in turn, secured to side beam 20 and block 39 is similarly secured to side beam 22. Various types of screws, rivets, clips, adhesives and other forms of attachment may be employed to fasten the blocks 37, 39 to side beams 20, 22. It should be understood that in alternative embodiments the posts 38 and 40 may be attached or otherwise engaged with elements of base 14 using different means of attachment or interengagement. It is simply important that the support 28 be held securely upright by the base upon the underlying floor F.

A horizontal crossbar 48 is mounted to and vertically adjustable along posts 38 and by means of respective channels 50 and 52, FIGS. 2 and 3. Crossbar 48 may include a square or rectangular cross sectional shape and may be composed of material similar to that composing the beams of base 14 and the posts 38 and 40 of upright support 28. Channels 50, 52 are selectively locked and unlocked relative to its respective posts 38, 40 by corresponding hand operated clamping locks 54 that threadably interengage channels 52 to respective posts 38, 40. By turning the lock handles counter-clockwise and releasing locks 54, channels 50, 52 are loosened relative to posts 38, 40 and the channels and attached crossbar 48 are allowed to slide vertically upwardly and downwardly along posts 38 and 40. This permits crossbar 48 and target panel 30, which is attached to and supported by the crossbar, to be raised and lowered so that the target 30 can be placed at a predetermined height for performing sensor calibration. When the desired predetermined height is achieved, the lock handles are simply turned clockwise to tighten locks 54 and thereby clamp the channels onto the respective posts. This holds the ADAS target panel at the selected height.

Target panel 30 is attached to the slidably adjustable horizontal crossbar 48 in the following manner. As shown in FIGS. 2 and 3, crossbar 48 carries a pair of rectangular tubular pieces 49 that project forwardly from and are interconnected to the crossbar and strengthened by triangular gussets 51. Tubular pieces 49 may comprise the same or similar type of components as form the previously described beams and crossbar. Various other means may be employed to interconnect pieces 49 to crossbar 48. The forward end of each piece 49 carries a respective hinge 53. More particularly, a first part 55 of each hinge is secured to a respective tubular piece 49 and a second part 57 of each hinge 53 is similarly secured to the rearward face of horizontal mounting bar 59. The mounting bar is, in turn, attached to the back surface of target panel 30 by screws or other means of attachment. A locking mechanism featuring a twist handle 61, FIG. 2, is operably connected to each hinge 53. Handles 61 are turned in a first direction to selectively unlock hinges 53. Mounting bar 59 and attached target panel 30 are thereby allowed to pivot as indicated by arrow 63 in FIG. 2. This enables the vertical angle of target panel 30 to be adjusted as required to orient the target surface so that it is perfectly perpendicular to floor F. The tilt can be measured using a bubble level or other level detecting device. Handles 61 are then turned in an opposite second direction to lock hinges 53 so that the target surface is held vertically perpendicular to both floor F and signals received from the ADAS sensors. Posts 38 and 40 are positioned within base 14 between beams 16 and 18 such that when the foregoing target surface orientation is achieved the plane of target surface 32 is flush with linear alignment edge 23 of beam 16, FIG. 2

Figure 4:
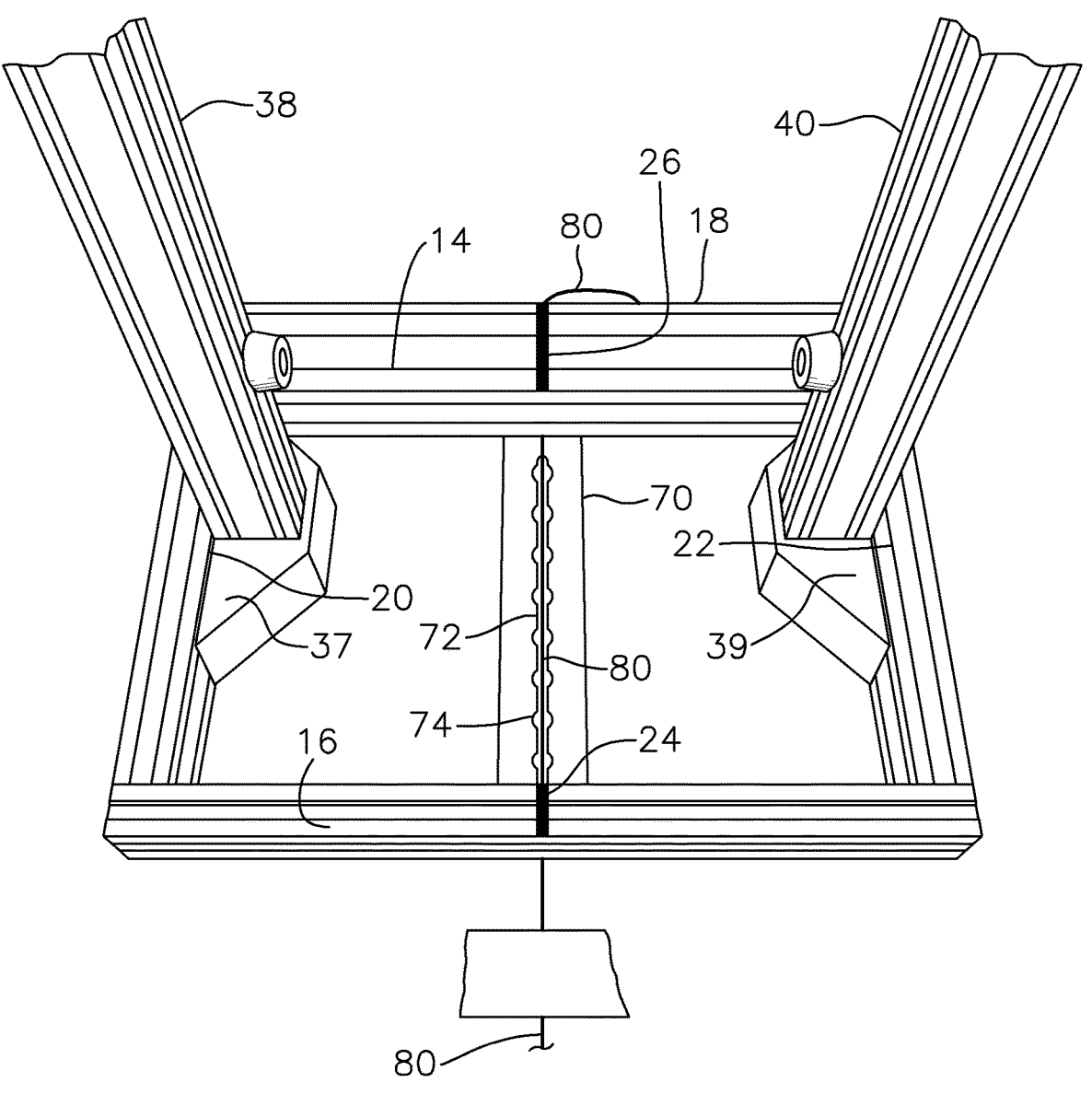
FIG. 4 is a fragmentary view of the base and lower ends of the support posts and depicting the linear alignment element interengaged and extending beyond the forward end of the base.

As best shown in FIGS. 3A-4, an alignment bracket 70 extends between forward beam 16 and rearward beam 18 of base 12. Bracket 70 comprises an elongate, substantially straight and flat strip of metal, metal alloy or alternative material as described above. It may be secured to the interior vertical walls of beams 16 and 18 or to the horizontal upper or lower walls of those beams. A longitudinal slot 72 extends centrally though bracket 70 and a series of holes 74 are optionally spaced along slot 72. The longitudinal slot is aligned with midpoint guidelines 24 and 26 formed in beams 16 and 18 respectively.

As depicted in FIGS. 1, 2 and 4, an elongate alignment element 80 engages base 14 and extends forwardly from linear alignment edge 23 of forward beam 16. Alignment element 80 preferably comprises a thin, flexible element such as string. As best shown in FIG. 4, element 80 intersects and extends between rearward beam 18 and forward beam 16. The alignment element continues forwardly beyond alignment edge 23 of beam 16. More particularly, element 80 extends between beams 16 and 18 through longitudinal slot 72 in alignment bracket 70. In the version depicted in FIG. 4, element 80 extends beneath forward and rearward beams 16 and 18 in alignment with forward and rearward guidelines 24 and 26, respectively. It should be understood that alignment element 80 may be attached to or interengage the forward and rearward beams of base 14 in various alternative ways. For example, it may be formed through holes in the vertical side walls of beams 16 and 18 or cross above the beams in alignment with the guidelines 24 and 26. In still other embodiments, depending tabs or brackets having aligned holes or passageways for accommodating element 80 may be carried by the respective beams 16 and 18 and aligned with the perpendicular guidelines. Whatever type of bracket is used to interengage the alignment element with the base, it is important that the engaged alignment element extend perpendicularly to the longitudinal axes of beams 16, 18 and/or to the linear alignment edge 23.

System 10 is employed in the manner shown in FIG. 5 in order to quickly, conveniently, efficiently and accurately perform static calibration on the front facing ADAS sensors of motor vehicle MV. The motor vehicle is positioned at the testing and calibration site on a substantially level underlying horizontal floor F. this should constitute a floor of the type that is conventionally used for static calibration of ADAS sensors. Target assembly 12, constructed at previously described, is positioned approximately 3-5 feet in front of motor vehicle MV such that target panel 30 generally faces and opposes the front facing ADAS sensors of the vehicle. To properly align the target assembly 12 with the motor vehicle, the tester determines the longitudinal centerline CL of motor vehicle MV. This is accomplished by plumbing forward and rearward points of the centerline from the front and rear badges B1 and B2, respectively, of the vehicle. These badges are conventionally mounted precisely at the center of the front and rear of the vehicle and therefore a longitudinal line interconnecting the plumbed points on floor F below the badges represents a longitudinal centerline of the vehicle. In particular, the plumbed locations on floor F are marked and alignment element 80 is extended linearly from base 14 of target assembly 12 and through the plumbed marks. The alignment element is stretched tight, straightened and positioned to intersect both of the plumbed centerline markings below badges B1 and B2. Accordingly, alignment element effectively traces and defines centerline CL. The string or other alignment element 80 may then be taped to floor F rearwardly and forwardly of vehicle MV at T1 and T2, respectively. This maintains element 80 in precise alignment with centerline CL. The orientation of target assembly 12 is manipulated and fine tuned, if necessary, so that forward beam 16, and more particularly linear edge 23, of base 14 forms a perpendicular angle with alignment element 80. At the same time, alignment element 80 is maintained in alignment with the plumbed markings below badges B1 and B2. If element 80 is taped to floor F at T2, in the manner shown in FIG. 5, an appropriate straight edge measuring device may be used to confirm that the adjoining segments of element 80 on respective sides of tape T2 remain perfectly aligned with one another. The required perpendicular angle formed between linear edge 23 of forward beam 16 and the stretched alignment element corresponding with center line CL reflects that the target assembly, and specifically horizontal axis 33 of target surface 32, is properly oriented at a perpendicular angle relative to the centerline of the vehicle. This perpendicular orientation can be measured and confirmed using a 90 degree square or an alternative device such as a protractor or digital angle ruler.

The height of target panel 30 may be adjusted as previously described so that the ADAS target surface is held at a prescribed height above floor F and relative to the ADAS sensors for performing static calibration. By the same token, the vertical angular tilt of target surface may be adjusted as needed to hold that surface upright, flush with linear edge 23 of forward beam 16 and vertically perpendicular relative to floor F, centerline CL and the facing ADAS sensors.

Most importantly, system 10 ensures that the target surface of target panel 30, and more particularly horizontal axis 33 of target surface 32 are correctly oriented to be precisely perpendicular to centerline CL. This ensures that the target surface is properly aligned with the ADAS sensors for performing static calibration of those sensors. System enables precise and accurate calibration of the sensors to be performed quickly, conveniently and efficiently. As the process is performed, the proper perpendicular orientation of the target panel is maintained simply by employing square 90 to check the angle between forward beam 16 and alignment element 60 and re-orienting target assembly 12, as needed. Adjusting the positioning of the target assembly, when required, is greatly facilitated. The calibration target is successfully positioned and oriented without requiring the tedious and time consuming measurements and heavy, expensive target equipment employed by conventional ADAS static calibration targets.

The present invention provides significant benefits in ADAS calibration. Because target surface 32 and horizontal axis 33 are themselves parallel to and flush with linear alignment edge 23 of beam 16, the target surface and horizontal axis are likewise oriented perpendicular to centerline. CL and the direction of the opposing sensors. The flush vertical alignment between target panel 30 and the linear alignment edge of base 14 eliminates the need to perform multiple additional measurements, as are required by conventional calibration tools, in order to properly align the target with the sensors. The present invention simply requires the longitudinal alignment edge of the base to be oriented perpendicularly to the centerline of the vehicle. When the height of the target is then adjusted, the correct target alignment is achieved automatically. This represents a significant advantage over the prior art. Aligning the target so that its horizontal axis is perfectly perpendicular to the direction of the sensors is accomplished in a relatively quick and convenient manner. In addition, the target employed using the present system is much less bulky, unwieldy and costly than known static calibration targets, and eliminates the use of lengthy and awkward positioning arms and time consuming measurement techniques in order to achieve a perfectly perpendicular aiming target orientation. The present system facilitates the process considerably and permits the use of a much simpler, more efficient, easier to use and less expensive ADAS target mechanism.

Accordingly, the present invention relates to an improved system and method for calibrating a motor vehicle's ADAS sensors. While this detailed description has set forth particularly preferred embodiments of the apparatus of this invention, numerous modifications and variations of the structure and method of this invention, all within the scope of the invention, will readily occur to those skilled in the art. Accordingly, it is understood that this description is illustrative only of the principles of the invention and not limitative thereof.

Although specific features of the invention are shown in some of the drawings and not others, this is for convenience only, as each feature may be combined with any and all of the other features in accordance with this invention.

What is claimed is:

1. A system for calibrating one or more ADAS sensors of a motor vehicle supported on a substantially level horizontal underlying horizontal floor, said system comprising:

a target assembly that includes a base for engaging the underlying floor, said base including a parallel pair of forward and rearward beams; said target assembly further including an upright support attached to and extending vertically upwardly from said base, said support carrying an ADAS target panel having a target surface that faces forwardly of said base and which said target surface includes a horizontal axis that is substantially parallel to said forward and rearward beams, said target panel being attached to said base such that said target panel is restricted from pivoting horizontally relative to said base and said horizontal axis of said target surface is fixed substantially parallel to said forward and rearward beams; and an elongate alignment element extending between and perpendicularly intersecting each of said rearward and forward beams of said base, said alignment element for engaging and extending forwardly beyond said forward beam;

said system being positioned and oriented on the underlying floor such that said target surface of said ADAS target panel faces and opposes the one or more ADAS sensors of the motor vehicle and said alignment element being extendable perpendicularly from said forward beam of said base to intersect a pair of marks disposed respectively below front center and rear center ends of the motor vehicle and define a longitudinal centerline of the motor vehicle, whereby said horizontal axis of said target surface is oriented perpendicularly to the longitudinal centerline of the motor vehicle.

2. The system of claim 1 in which said alignment element is flexible.

3. The system of claim 1 in which said alignment element includes string.

4. The system of claim 1 in which said forward and rearward beams include respective linear midpoints that are aligned such that said alignment element perpendicularly intersects said rearward and forward beams at each respective linear midpoint.

5. The system of claim 1 in which said support includes a pair of vertical posts and in which said ADAS target panel is connected to a horizontal crossbar, which crossbar is mounted to said vertical posts for moving selectively in upward and downward directions along said posts to adjust a height of said target panel relative to the one or more ADAS sensors of the motor vehicle.

6. The system of claim 5 in which said ADAS target panel is hingedly connected to said horizontal crossbar for adjusting an angle of said forward-facing target surface relative to the underlying floor and one or more ADAS sensors of the motor vehicle.

7. The system of claim 1 in which said base includes a pair of side beams that perpendicularly interconnect respective ends of said forward and rearward beams to hold said forward and rearward beams parallel to one another.

8. The system of claim 4 in which said base further includes an alignment bracket perpendicularly interconnecting said forward and rearward beams and having a central slot aligned with said respective linear midpoints of said forward and rearward beams, said alignment element being aligned with said central slot and interconnecting said respective linear midpoints of said forward and rearward beams.

9. The system of claim 4 in which said linear midpoints of said forward and rearward beams include respective guidelines that mark respective points of intersection of said linear alignment element with said forward and rearward beams.

10. A method of calibrating ADAS sensors directed from an end of a motor vehicle supported on a substantially horizontally level underlying floor, said method comprising:

providing an ADAS target assembly that includes a base having a linear alignment edge and an upright support attached to and extending vertically upwardly from the base, which support carries an ADAS target panel having a target surface facing forwardly of the base, which said target surface has a horizontal axis substantially parallel to the linear alignment edge;

attaching said target panel to said base such that said target panel is restricted from pivoting horizontally relative to said base and said horizontal axis of said target surface is fixed substantially parallel to said forward and rearward beams;

hingedly attaching said ADAS target panel to said support and pivoting said target panel about said horizontal axis of said target surface to direct said target surface at a predetermined angle to the ADAS sensors;

providing an elongate alignment element for extending forwardly from the linear alignment edge of the base;

positioning the assembly on the underlying floor such that the target surface of the ADAS target panel faces and opposes the ADAS sensors of the motor vehicle;

extending said alignment element perpendicularly from said alignment edge to intersect a pair of marks disposed respectively below front center and rear center ends of the motor vehicle and establish a longitudinal centerline of the motor vehicle; and manipulating the target assembly and the alignment element such that the alignment element is aligned with the longitudinal centerline of the motor vehicle and extends perpendicularly to the linear alignment edge of the base, whereby the horizontal axis of the target surface of the ADAS target panel is oriented perpendicularly to the centerline of the motor vehicle.

11. The method of claim 10 further including providing a support that includes at least one vertical post and adjusting the ADAS target panel along said at least one post to a predetermined height.

12. The method of claim 10 further including the steps of providing the base with a parallel pair of forward and rearward beams, which forward beam includes the leading alignment edge.

13. The method of claim 10 further including the step of securing the alignment element to the underlying floor at a first location beyond the end of the motor vehicle that is opposite the end from which the ADAS sensors are directed and at a second location rearwardly of the base.

14. A system for calibrating ADAS sensors directed from an end of a motor vehicle supported on a substantially level horizontal underlying floor, said system comprising:

a target assembly including a base having a linear alignment edge, said target assembly further including an upright support attached to and extending vertically upwardly from said base, said support carrying an ADAS target panel having a target surface secured to and facing forwardly of the base, which said target surface has a horizontal axis substantially parallel to said linear alignment edge, said ADAS target panel being attached to said base such that said target panel is restricted from pivoting horizontally relative to said base and said horizontal axis of said target surface is fixed substantially parallel to said forward and rearward beams, said ADAS target panel being hingedly connected to said support for pivoting said ADAS target panel to direct said target surface forwardly at a predetermined vertical angle relative to the underlying floor and ADAS sensors of the motor vehicle; and an elongate alignment element for engaging and extending forwardly from said linear alignment edge; said target assembly being positioned on the underlying floor such that said target surface of said ADAS target panel faces and opposes the ADAS sensors of the motor vehicle and said alignment element being extendable perpendicularly from said linear alignment edge of said base for intersecting a pair of marks disposed respectively below front center and rear center ends of the motor vehicle to align with and determine a longitudinal centerline of the motor vehicle, whereby said horizontal axis of said target surface is oriented perpendicularly to the longitudinal centerline of the vehicle.

15. A system for calibrating one or more ADAS sensors of a motor vehicle supported on a substantially level horizontal underlying floor, said system comprising:

a target assembly that includes a base for engaging the underlying floor, said base including a parallel pair of forward and rearward beams; said target assembly further including an upright support attached to and extending vertically upwardly from said base, said support carrying an ADAS target panel having a target surface that faces forwardly of said base and which said target surface includes a horizontal axis that is substantially parallel to said forward and rearward beams, said support includes a pair of vertical posts and in which said ADAS target panel is connected to a horizontal crossbar, which crossbar is mounted to said vertical posts for moving selectively in upward and downward directions along said posts to adjust a height of said target panel relative to the one or more ADAS sensors of the motor vehicle, said ADAS target panel being hingedly connected to said horizontal crossbar for adjusting an angle of said forward-facing target surface relative to the underlying floor and one or more ADAS sensors of the motor vehicle; and an elongate alignment element extending between said rearward and forward beams of said base, said alignment element for engaging and extending forwardly beyond said forward beam;

said system being positioned and oriented on the underlying floor such that said target surface of said ADAS target panel faces and opposes the one or more ADAS sensors of the motor vehicle and said alignment element aligns with a longitudinal centerline of the motor vehicle and extends perpendicularly from said forward beam of said base, whereby said horizontal axis of said target surface is oriented perpendicularly to the longitudinal centerline of the vehicle.

16. The system of claim 15 in which said alignment element perpendicularly intersects each of said forward and rearward beams.

17. A system for calibrating one or more ADAS sensors of a motor vehicle supported on a substantially level horizontal underlying floor, said system comprising:

a target assembly that includes a base for engaging the underlying floor, said base including a parallel pair of forward and rearward beams; said target assembly further including an upright support attached to and extending vertically upwardly from said base, said support carrying an ADAS target panel having a target surface that faces forwardly of said base and which said target surface includes a horizontal axis that is substantially parallel to said forward and rearward beams; and an elongate alignment element extending between said rearward and forward beams of said base, said alignment element for engaging and extending forwardly beyond said forward beam, said forward and rearward beams including respective linear midpoints that are aligned such that said alignment element perpendicularly intersects said rearward and forward beams at each respective linear midpoint; said base further including an alignment bracket perpendicularly interconnecting said forward and rearward beams and having a central slot aligned with said respective midpoints of said forward and rearward beams, said alignment element being aligned with said central slot and interconnecting said respective linear midpoints of said forward and rearward beams at each respective linear midpoint;

said system being positioned and oriented on the underlying floor such that said target surface of said ADAS target panel faces and opposes the one or more ADAS sensors of the motor vehicle and said alignment element aligns with a longitudinal centerline of the motor vehicle and extends perpendicularly from said forward beam of said base, whereby said horizontal axis of said target surface is oriented perpendicularly to the longitudinal centerline of the vehicle.

18. A system for calibrating one or more ADAS sensors of a motor vehicle supported on a substantially level horizontal underlying floor, said system comprising:

a target assembly that includes a base for engaging the underlying floor, said base including a parallel pair of forward and rearward beams; said target assembly further including an upright support attached to and extending vertically upwardly from said base, said support carrying an ADAS target panel having a target surface that faces forwardly of said base and which said target surface includes a horizontal axis that is substantially parallel to said forward and rearward beams, said forward and rearward beams including respective linear midpoints that are aligned such that said alignment element perpendicularly intersects said rearward and forward beams at each respective linear midpoint, said linear midpoints of said forward and rearward beams including respective guidelines that mark respective points of intersection of said linear alignment element with said forward and rearward beams; and an elongate alignment element extending between said rearward and forward beams of said base, said alignment element for engaging and extending forwardly beyond said forward beam;

said system being positioned and oriented on the underlying floor such that said target surface of said ADAS target panel faces and opposes the one or more ADAS sensors of the motor vehicle and said alignment element aligns with a longitudinal centerline of the motor vehicle and extends perpendicularly from said forward beam of said base, whereby said horizontal axis of said target surface is oriented perpendicularly to the longitudinal centerline of the vehicle.

19. A method of calibrating ADAS sensors directed from an end of a motor vehicle supported on a substantially horizontally level underlying floor, said method comprising:

providing an ADAS target assembly that includes a base having a linear alignment edge and an upright support attached to and extending vertically upwardly from the base, which support carries an ADAS target panel having a target surface facing forwardly of the base, which target surface has a horizontal axis substantially parallel to the linear alignment edge;

further providing an elongate alignment element for extending forwardly from the linear alignment edge of the base;

positioning the assembly on the underlying floor such that the target surface of the ADAS target panel faces and opposes the ADAS sensors of the motor vehicle;

hingedly attaching the ADAS target panel to the support and pivoting the ADAS target panel to direct the target surface forwardly at a predetermined angle to the ADAS sensors determining a longitudinal centerline of the motor vehicle; and manipulating the target assembly and the alignment element such that the alignment element is aligned with the longitudinal centerline of the motor vehicle and extends perpendicularly to the linear alignment edge of the base, whereby the horizontal axis of the target surface of the ADAS target panel is oriented perpendicularly to the centerline of the motor vehicle.

20. A method of calibrating ADAS sensors directed from an end of a motor vehicle supported on a substantially horizontally level underlying floor, said method comprising:

providing an ADAS target assembly that includes a base having a linear alignment edge and an upright support attached to and extending vertically upwardly from the base, which support carries an ADAS target panel having a target surface facing forwardly of the base, which said target surface has a horizontal axis substantially parallel to the linear alignment edge;

further providing an elongate alignment element for extending forwardly from the linear alignment edge of the base;

positioning the assembly on the underlying floor such that said target surface of the ADAS target panel faces and opposes the ADAS sensors of the motor vehicle;

determining a longitudinal centerline of the motor vehicle;

manipulating the target assembly and the alignment element such that the alignment element is aligned with the longitudinal centerline of the motor vehicle and extends perpendicularly to the linear alignment edge of the base; and securing the alignment element to the underlying floor at a first location beyond the end of the motor vehicle that is opposite the end from which the ADAS sensors are directed and at a second location rearwardly of the base, whereby the horizontal axis of the target surface of the ADAS target panel is oriented perpendicularly to the centerline of the motor vehicle.

* * * * *